(12) United States Patent
Danielson et al.

(10) Patent No.: US 12,066,226 B2
(45) Date of Patent: Aug. 20, 2024

(54) SERVICE TOOLS AND SYSTEMS FOR PROCESSING FLUID THROUGH A FLUID ACCESS PORT

(71) Applicant: FasTest, Inc., Roseville, MN (US)

(72) Inventors: Robert Danielson, Roseville, MN (US); Allen Wagenius, Roseville, MN (US)

(73) Assignee: FasTest, Inc., Roseville, MN (US)

( * ) Notice: Subject to any disclaimer, the term of this patent is extended or adjusted under 35 U.S.C. 154(b) by 32 days.

(21) Appl. No.: 17/664,302

(22) Filed: May 20, 2022

(65) Prior Publication Data

US 2022/0373239 A1 Nov. 24, 2022

Related U.S. Application Data

(60) Provisional application No. 63/190,900, filed on May 20, 2021.

(51) Int. Cl.
*F25B 41/40* (2021.01)
*F25B 45/00* (2006.01)

(52) U.S. Cl.
CPC .............. *F25B 41/40* (2021.01); *F25B 45/00* (2013.01); *F25B 2345/005* (2013.01); *F25B 2345/006* (2013.01)

(58) Field of Classification Search
CPC .... F25B 41/40; F25B 45/00; F25B 2345/005; F25B 2345/006; F16L 37/23; F16L 37/35
See application file for complete search history.

(56) References Cited

U.S. PATENT DOCUMENTS

| 3,301,272 | A | * | 1/1967 | Pettyjohn | F16L 37/36 |
| | | | | | 137/614.06 |
| 5,074,332 | A | * | 12/1991 | Jones | F16L 37/35 |
| | | | | | 251/149.9 |
| 5,080,132 | A | | 1/1992 | Manz et al. | |
| 6,050,295 | A | | 4/2000 | Meisinger et al. | |
| 6,901,947 | B2 | | 6/2005 | Danielson et al. | |
| 9,897,239 | B2 | * | 2/2018 | Konishi | F16L 37/36 |

(Continued)

FOREIGN PATENT DOCUMENTS

| EP | 2514454 A1 * | 10/2012 | ............... A61M 5/24 |
| GB | 2501878 A * | 11/2013 | ......... H01R 13/6271 |

(Continued)

OTHER PUBLICATIONS

International Search Report and Written Opinion, issued in the corresponding PCT application No. PCT/IB2022/054635, dated Aug. 26, 2022, 10 pages.

*Primary Examiner* — Kun Kai Ma
(74) *Attorney, Agent, or Firm* — MERCHANT & GOULD

(57) ABSTRACT

A traveling service tool that is configured to removably attach to a fluid access port of a refrigerant system. The fluid access port can be the fluid access port described herein or an existing fluid access port. When used with the fluid access port described herein, the traveling service tool is configured to hold a removable core during processing, and ultimately install the core into the fluid access port at a suitable stage in the processing operations. In an embodiment, the traveling service tool remains attached to and travels with the refrigerant system for the refrigerant system to be processed at two or more separate fluid processing stations.

12 Claims, 15 Drawing Sheets

(56) References Cited

U.S. PATENT DOCUMENTS

| | | | |
|---|---|---|---|
| 10,876,775 B2 | 12/2020 | Danielson et al. | |
| 2002/0096209 A1* | 7/2002 | Danielson | F16L 37/23 |
| | | | 137/15.09 |
| 2003/0140971 A1 | 7/2003 | Haunhorst et al. | |
| 2019/0333420 A1* | 10/2019 | Danielson | F16L 37/1235 |
| 2020/0041182 A1 | 2/2020 | Danielson et al. | |

FOREIGN PATENT DOCUMENTS

| | | |
|---|---|---|
| KR | 10-2004-0094678 | 11/2004 |
| WO | 95-04238 | 2/1995 |

* cited by examiner

SERVICE TOOLS AND SYSTEMS FOR PROCESSING FLUID THROUGH A FLUID ACCESS PORT

FIELD

This technical disclosure relates to refrigerant systems, such as air conditioning units, refrigerators, and like products that utilize a refrigerant for cooling, and to apparatus, tooling, and methods used to process fluids into or from refrigerant systems.

BACKGROUND

Refrigerant systems, such as air conditioning units and the like, employ a refrigerant contained in a closed loop system to provide cooling. Access to the closed loop system is commonly provided by a service connection or service valve block. The service connection is valved to permit charging, evacuation, and/or testing of the closed loop system for a variety of purposes by manufacturing personnel during manufacture or by service personnel in the field.

Examples of apparatus, tooling and methods used in processing refrigerant systems are described in U.S. Pat. Nos. 6,050,295; 6,901,947; 10,876,775; and U.S. 2020/0041182.

SUMMARY

Apparatus, tooling, and methods are described that are used to process fluids into or from refrigerant systems. The refrigerant systems can be any closed loop systems that utilize a refrigerant to provide cooling. Examples of refrigerant systems that can be used with the apparatus, tooling and methods described herein include, but are not limited to, air conditioning units, refrigerators and other refrigeration systems, and the like.

In an embodiment, a unique fluid access port described herein can be attached to a refrigerant system, for example by brazing the fluid access port to the refrigerant system. The fluid access port is operable with a removable core that controls fluid flow through the fluid access port when the core is mounted within the fluid access port. Fluid processing operations on the refrigerant system are conducted by attaching various service tools to the fluid access port.

In another embodiment, a service tool, which can be referred to as a traveling service tool, is described herein. The traveling service tool is configured to removably attach to a fluid access port of a refrigerant system. The fluid access port can be the fluid access port described herein or an existing fluid access port. When used with the fluid access port described herein, the traveling service tool is configured to hold the removable core during processing, and ultimately install the core into the fluid access port at a suitable stage in the processing operations. In an embodiment, the traveling service tool remains attached to and travels with the refrigerant system for the refrigerant system to be processed at two or more separate fluid processing stations.

Additional service tools are described herein that removably attach to the fluid access port or to the traveling service tool to assist in processing fluid into or from the refrigerant system at some of the fluid processing stations.

In an embodiment, a service tool is described that connects to the fluid access port that is operable with the removable core which is configured to control fluid flow through the fluid access port when the removable core is mounted within the fluid access port. The service tool can include a generally hollow cylindrical body having a first end, a second end and a longitudinal axis. A latching connecter is located at the first end of the generally hollow cylindrical body, where the latching connector is configured to releasably connect the generally hollow cylindrical body to the fluid access port. A torque assembly is disposed at least partially within the generally hollow cylindrical body, and the torque assembly is rotatable relative to the generally hollow cylindrical body about the longitudinal axis. The torque assembly includes a fluid flow passageway through which fluid can flow, and a poppet valve in the fluid flow passageway that controls fluid flow through the fluid flow passageway. The poppet valve is rotatable with the torque assembly relative to the generally hollow cylindrical body. In addition, a seat is defined on the torque assembly that is configured to hold the removable core thereon so that the removable core is rotatable with the torque assembly. This service tool may be the traveling service tool which remains attached to the fluid access port, and therefore to the refrigerant system, during processing at two or more separate fluid processing stations. When fluid processing through the service tool is finished, the service tool can be used to install the core within the fluid access port to close off fluid flow through the fluid access port prior to disconnecting the service tool.

In another embodiment, a method of processing a refrigerant system is described. The refrigerant system has a fluid access port secured thereto, such as the fluid access port described herein. In the method, the removable core is temporarily mounted within a first service tool, for example by manually mounting the core in the first service tool. Thereafter, the first service tool is removably connected to the fluid access port, and a second service tool is removably connected to the first service tool. A fluid is then processed from or into the refrigerant system through the first service tool and the second service tool at a first fluid processing station. Thereafter, the second service tool is disconnected from the first service tool, and a third service tool is removably connected to the first service tool. Thereafter, a fluid is processed from or into the refrigerant system through the first service tool and the third service tool at a second fluid processing station separate from the first fluid processing station. The third service tool is then disconnected from the first service tool. Thereafter, the first service tool is used to mount the removable core within the fluid access port.

DRAWINGS

FIG. 1 schematically illustrates an example of a refrigerant system with a fluid access port as described herein.

DETAILED DESCRIPTION

Figure 1:
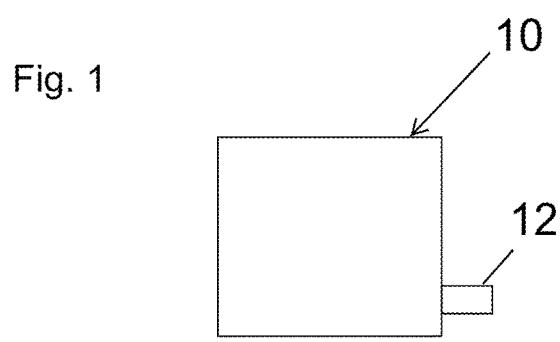

Referring initially to FIG. 1, a refrigerant system 10 is schematically depicted. The refrigerant system 10 can be any closed loop system that utilizes a refrigerant to provide cooling. Examples of the refrigerant system 10 include, but are not limited to, an air conditioning unit, a refrigerator or other refrigeration system, and the like. A fluid access port 12 is secured to the closed loop refrigerant system of the refrigerant system 10 and through which various fluid processing operations on the refrigerant system 10 can take place. During fluid processing, a fluid can be withdrawn from the refrigerant system 10 (for example, evacuating the system 10), a fluid can be directed into the refrigerant system 10 (for example, charging the system 10), or the system 10 can be tested (for example, burst or leak testing of the system 10). The fluid access port 12 can be secured to the refrigerant system 10 in any suitable manner, for example by brazing or welding the fluid access port 12 to the system 10, or using threads. Although the fluid access port 12 is depicted in FIG. 1 as projecting beyond the side wall of the system 10, the fluid access port 12 can be recessed and need not project beyond the side wall of the system 10.

Figure 2:
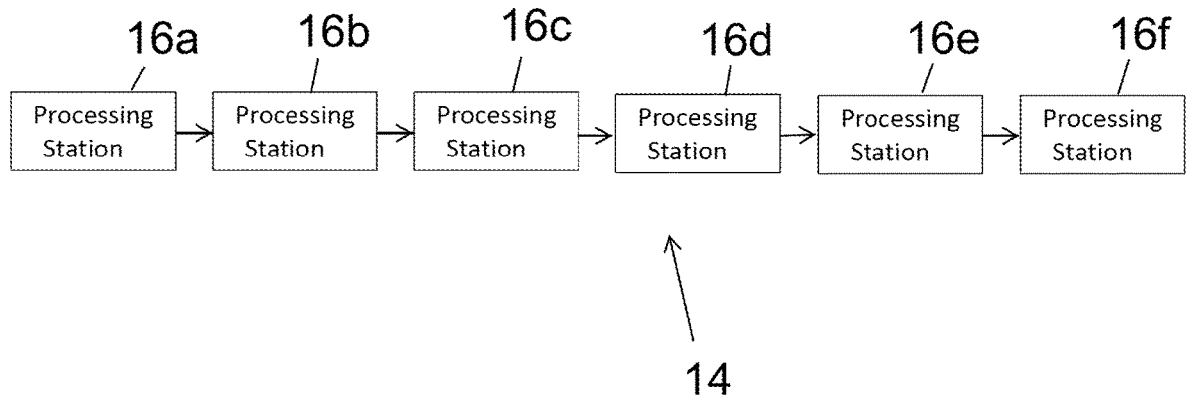
FIG. 2 illustrates an example of fluid processing stations for processing the refrigerant system using the service tools described herein.

Referring to FIGS. 1 and 2, the fluid processing that occurs on the system 10 can be any one or more fluid processing operations that are known in the art. The fluid processing operation(s) can take place during manufacture of the refrigerant system 10, during servicing at the location where the system 10 is installed, during refurbishment of the system 10 or at any other time and location. FIG. 2 illustrates an example of a system 14 for performing fluid processing operations on the system 10 during manufacturing of the system 10. In this example, the system 14 is shown as including a number of separate fluid processing stations 16a-f each of which performs a different processing operation on the system 10. During processing, the system 10 is transported, for example mechanically transported, from processing station to processing station and at each station 16a-f a fluid processing operation can take place. In one embodiment, prior to beginning processing at the station 16a, the fluid access port 12 is secured to the system 10. Attaching the fluid access port 12 to the system 10 can occur at a station prior to the station 16a or the attachment can occur at the station 16a.

The types of fluid processing that can occur at the stations 16a-f can be any fluid processing operations that are known to take place on refrigerant systems. For example, the station 16a can be configured to perform fluid processing in the form of a burst/leak check of the system 10. At the station 16a, a service tool (not shown) would be removably attached to the port 12. During processing, the pressure of the system 10 can be raised to check for burst and then a leak check can be performed. The construction and operation of service tools that can removably attach to a fluid access port for performing burst and leak checks are well known in the art. At the conclusion of the processing, the service tool is disconnected and the refrigerant system 10 is then mechanically transported to the processing station 16b.

Figure 12:
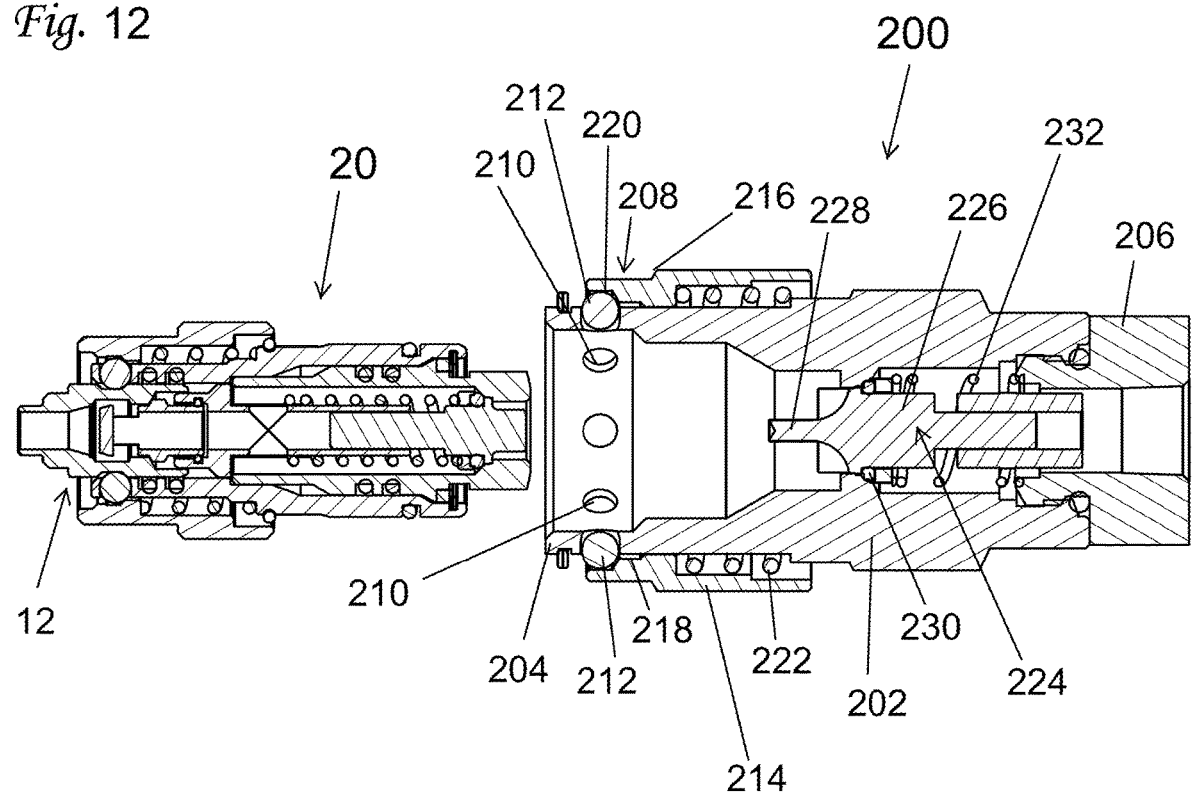
FIG. 12 shows an example of a second service tool in position to be removably attached to the traveling service tool.
Figure 13:
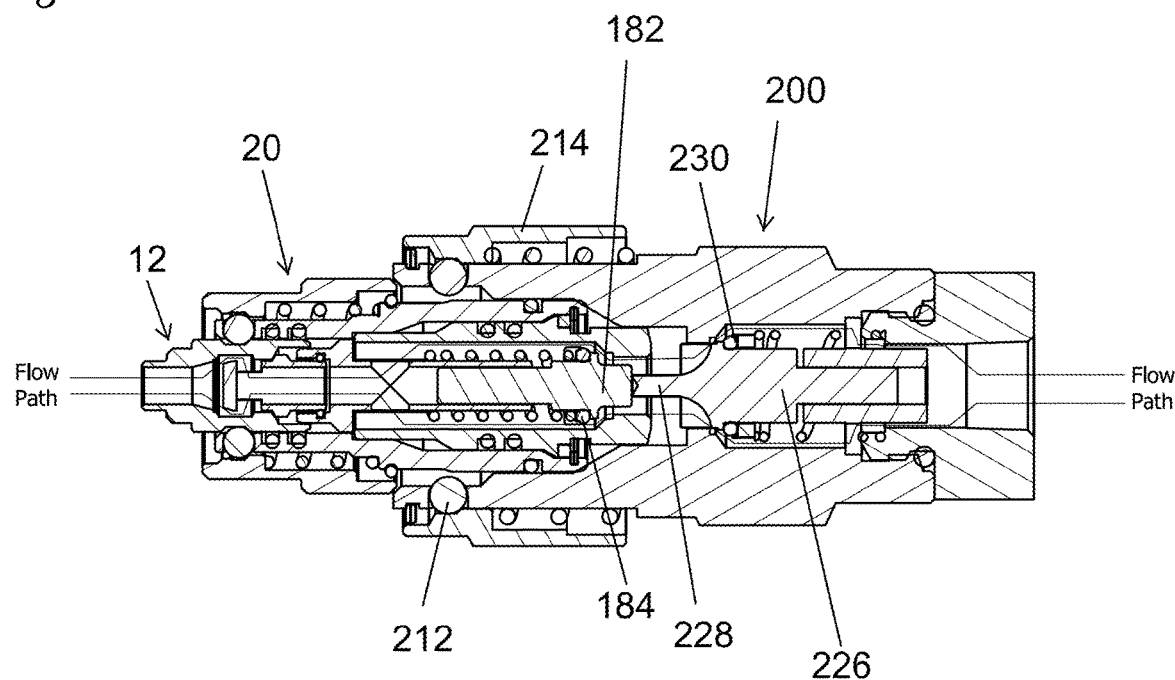
FIG. 13 shows the second service tool of FIG. 12 removably attached to the traveling service tool.

The station 16b can be configured to perform fluid processing in the form of evacuation of the system 10 to remove air and moisture. Evacuation is performed by connecting a vacuum pump to the system 10. At the station, the system 10 needs to be sealed to atmosphere for the remainder of the processing of the system 10. As described in further detail below, a service tool 20 (seen in FIGS. 6-10), which is also referred to as a traveling service tool, is attached to the port 12 and through which the evacuation takes place together with another service tool (FIGS. 12-13). The service tool 20 is valved to seal the system 10 and remains attached to and travels with the system 10 to one or more of the downstream stations 16c-f. Once the system 10 is evacuated, the system 10 is disconnected from the vacuum pump with the service tool 20 remaining attached to the port to seal the system 10 as the system 10 is mechanically transported to the processing station 16c.

The station 16c can be configured as a charge station to charge the system 10 by filling the system 10 with refrigerant. A charge gun, the construction of which is generally known in the art, will be connected to the service tool 20 and then refrigerant is introduced into the system 10. Once the system 10 is fully charged, the charge gun is disconnected from the service tool 20 which remains attached to the port 12 to seal the system 10. The system 10 with the service tool 20 connected thereto is then mechanically transported to the processing station 16d.

The station 16d can be configured to check operation of the system 10. Upon reaching the station 16d, a service tool (seen in FIGS. 14-16) is attached to the service tool 20. The service tool of FIGS. 14-16 opens a valve in the service tool 20, allowing the system 10 to flow and operation of the system 10 is checked. If the system 10 passes the operation test, the system 10 is mechanically transported to the station 16e. If the system 10 fails the test, the system 10 can be mechanically transported to the station 16f. At the station 16d, the system 10 is under pressure so the service tool (FIGS. 14-16) that is attached to the service tool 20 requires a mechanical advantage for actuating the valve (described below) of the service tool 20.

Figure 14:
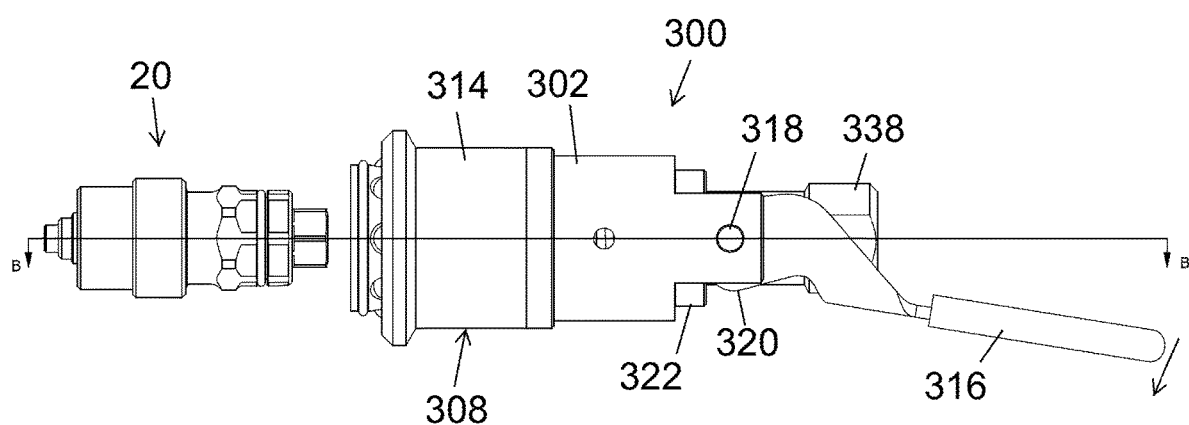
FIG. 14 is a side view of a third service tool in position to be removably attached to the traveling service tool.
Figure 15:
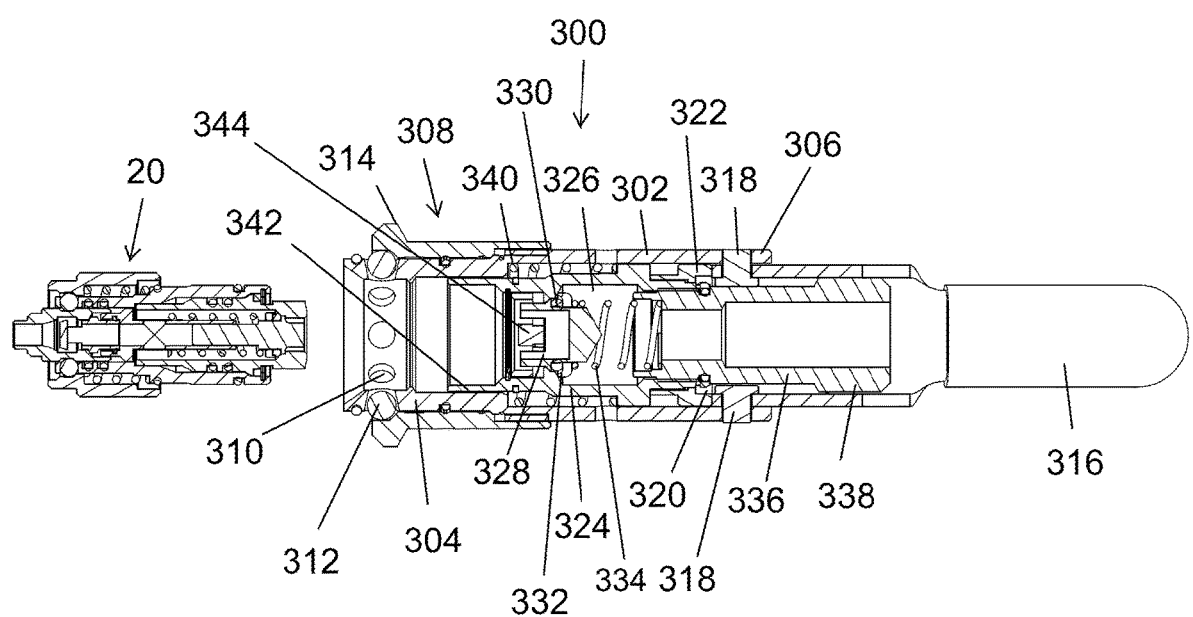
FIG. 15 is a longitudinal cross-sectional view of the third service tool of FIG. 14 taken along line B-B.
Figure 16:
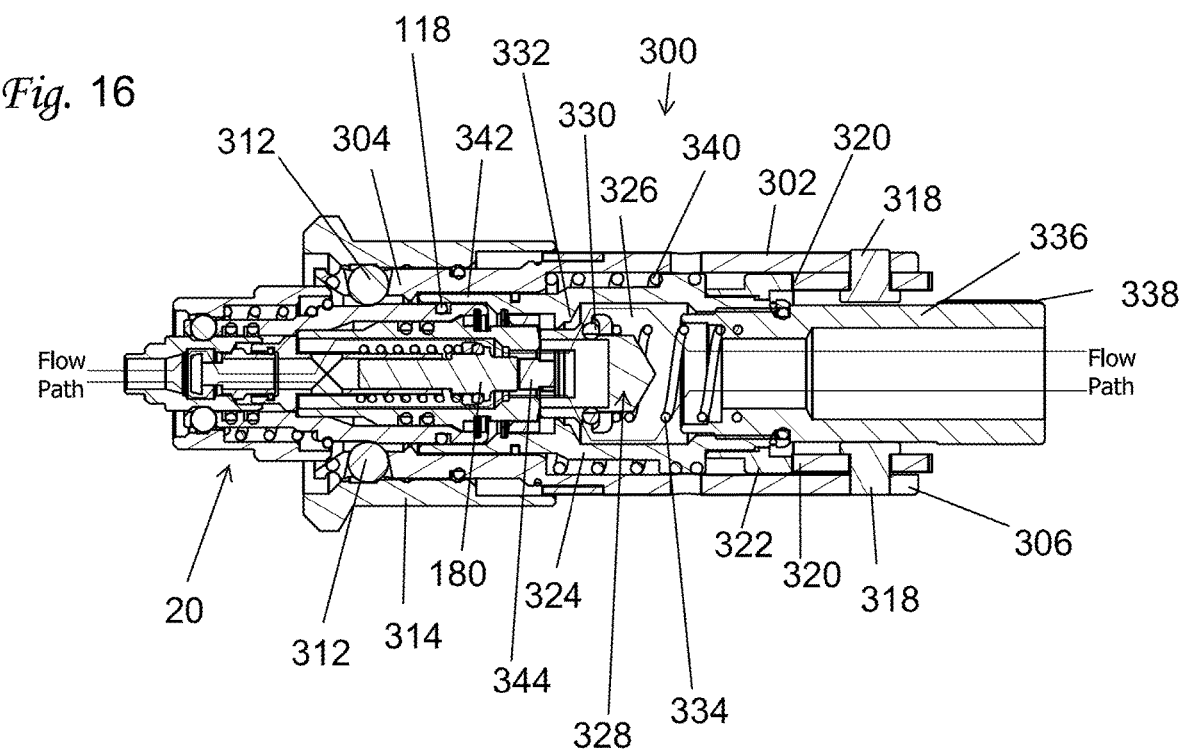
FIG. 16 depicts the third service tool removably attached to the traveling service tool and showing a flow path of fluid through the third service tool, the traveling service tool and the fluid access port.

The station 16e can be configured as a final fill, close and reclaim station. At the station 16e, the system 10 is essentially complete and a final charge of refrigerant is introduced into the system 10. To achieve the final charge, the service tool of FIGS. 14-16 can be attached to the service tool 20 and refrigerant is then introduced into the system 10 until full. The system 10 must then be sealed/closed. The service tool of FIGS. 14-16 would be removed from the tool 20. The tool 20 is then used to insert the core into the port 12 to seal off the system 10. Some remaining refrigerant would be trapped in the service tool 20 which would need to be reclaimed. The service tool of FIGS. 14-16 can be attached to the service tool 20 to reclaim the trapped refrigerant. Once the service tool of FIGS. 14-16 is disconnected from the service tool 20, the core is installed into the port 12 to seal the system 10, and the service tool 20 is disconnected from the system 10, the service tool 20 can then be returned to the station 16b for re-use. The system 10 is also under pressure at the station 16e so the service tool of FIGS. 14-16 requires the mechanical advantage for actuating the valve (described below) of the service tool 20.

The station 16f can be configured as a rework station to handle systems that fail the test at station 16d. At the station 16f, the system 10 can be analyzed, possibly evacuated of refrigerant, fixed and returned to the assembly line at the station 16a or the station 16b to be processed. A service tool like the one described in U.S. Pat. No. 6,901,947 could be used to remove the core from the port 12 under pressure and allow for replacement of the core.

Figure 3:
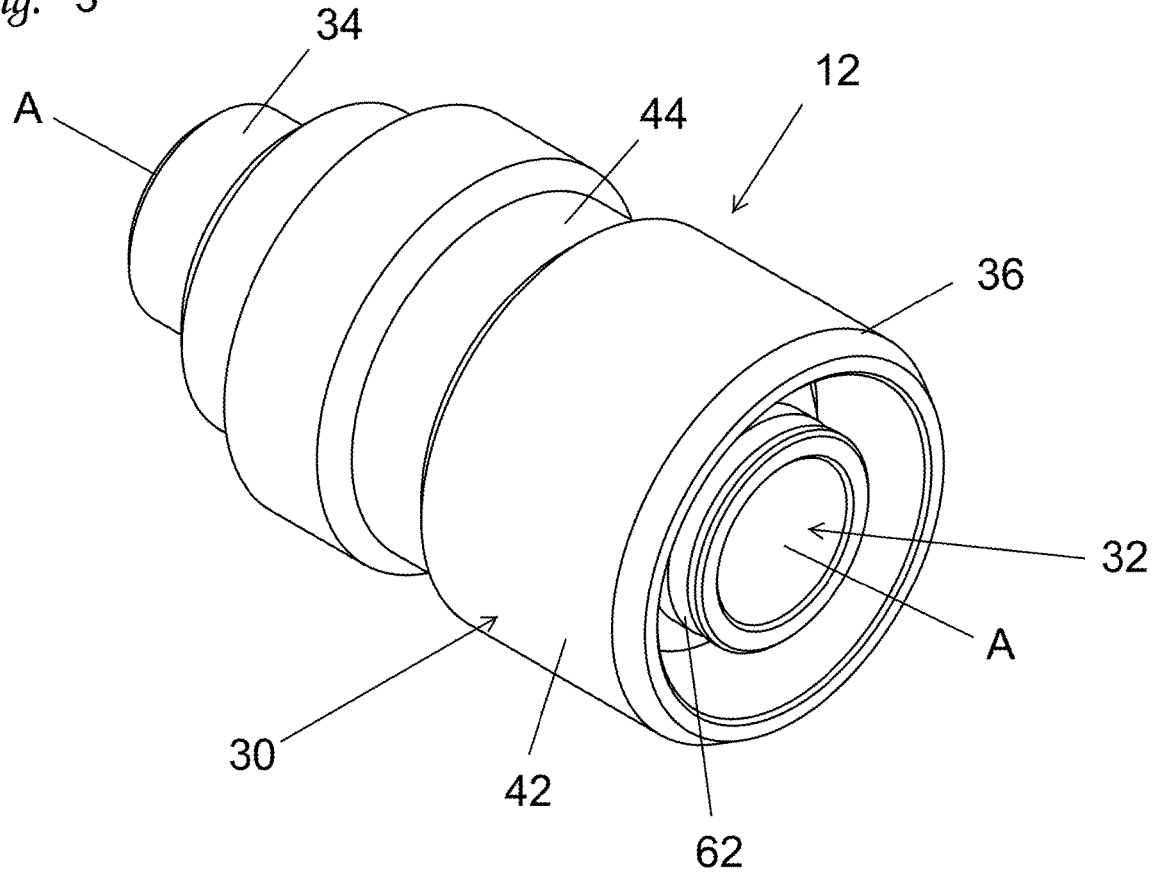
FIG. 3 is a perspective view of a fluid access port described herein.
Figure 4:
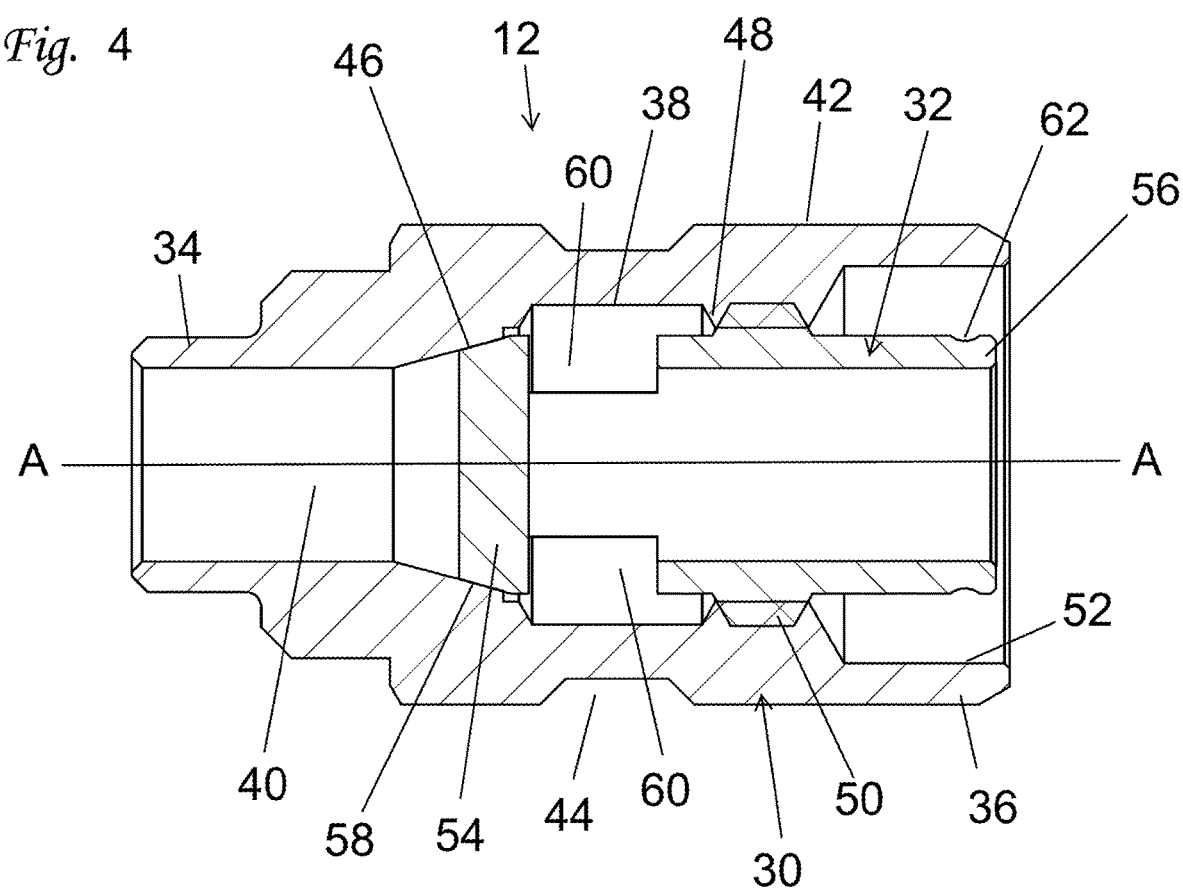
FIG. 4 is a longitudinal cross-sectional view of the fluid access port of FIG. 3 with the core in a closed position.
Figure 5:
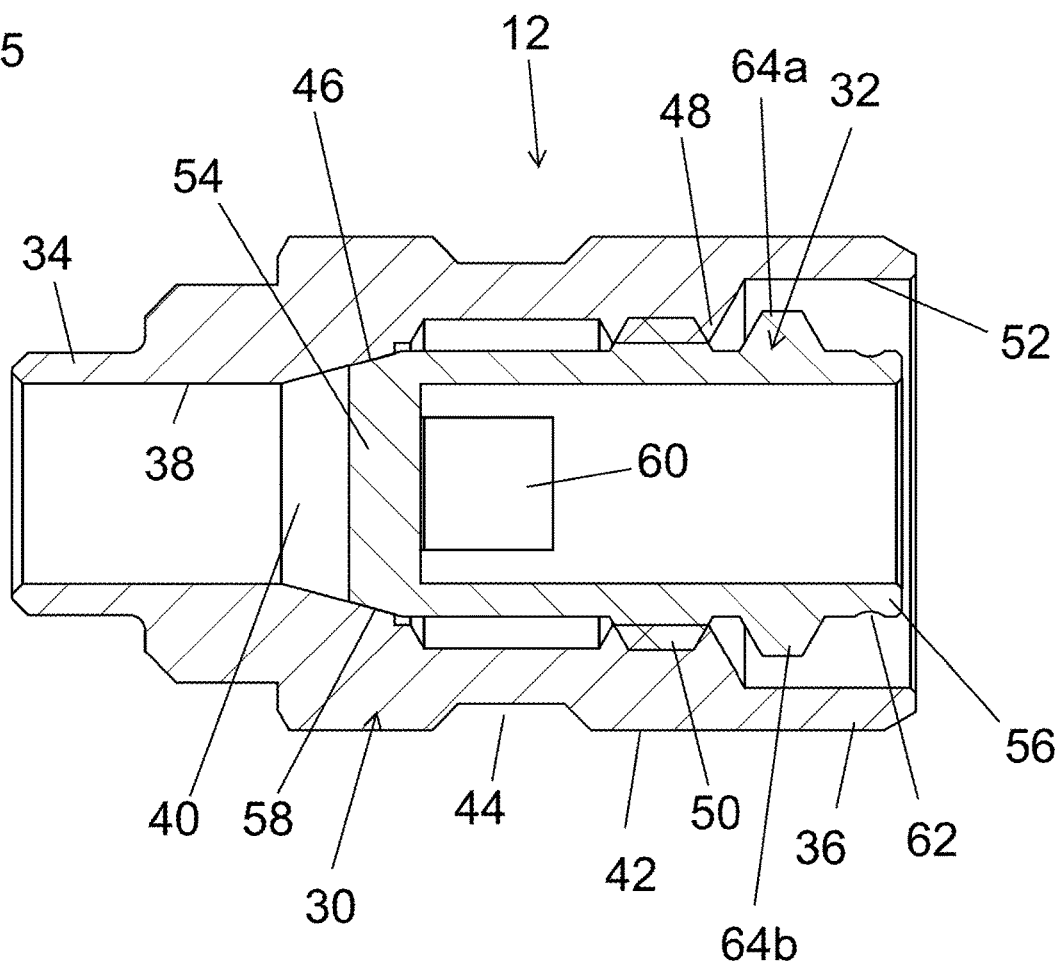
FIG. 5 is another longitudinal cross-sectional view of the fluid access port but rotated 90 degrees compared to FIG. 4.

FIGS. 3-5 illustrate an example of the fluid access port 12. The port 12 comprises (or consists of or consists essentially of) a generally cylindrical valve body 30 and a generally cylindrical, removable core 32 that controls fluid flow through the valve body 30. The valve body 30 is a generally cylindrical structure having a longitudinal axis A-A, a first open end 34 and a second open end 36 opposite the first open end 34, and an interior surface 38 defining a passageway 40 extending along the longitudinal axis A-A from the first open end 34 to the second open end 36. The first open end 34 is configured to be attached to the system 10, and a fluid is intended to flow from or into the second open end 36 during a processing operation through the port 12. In the illustrated example, an exterior surface 42 of the valve body 30 includes a circumferential detent groove 44 that a service tool, such as the service tool 20, can latch onto. The valve body 30 can be secured to the system 10 in any suitable manner. For example, if the valve body 30 is made of a metal material such as brass, the first open end 34 may be brazed to the system 10. However, the valve body 30 may be made from other materials, such as plastic, and in other embodiments the first open end 34 may be fastened to the system 10 using adhesive or using a mechanical fastening system involving one or more mechanical fasteners. Preferably, the first open end 34 is fastened to the system 10 in a manner to provide a fluid tight seal between the valve body 30 and the system 10 to prevent fluid leakage.

Referring to FIGS. 4-5, a valve seat 46 is defined within the valve body 30 through which the passageway 40 extends. The valve seat 46 is illustrated as being an angled, circumferentially continuous surface on the interior surface 38 that tapers inwardly as the valve seat 46 extends toward the first end 34. In addition, interior threads 48 are formed on a portion of the interior surface 38 at a position suitable to engage with exterior threads 50 formed on the core 32 to permit adjustment of the core 32 relative to the valve body 30 from an open position (not shown) to a closed position (shown in FIGS. 4 and 5). Further, the valve body 30 includes an unthreaded section 52 that is located between the threads 48 on the interior surface 38 and the second open end 36. However, the unthreaded section 52 is not required and the threads 48 could extend to or near the end 36.

With continued reference to FIGS. 4-5, the core 32 is configured to be inserted into the valve body 30 from outside the valve body 30. Once inserted, the core 32 can be advanced or retracted relative to the valve body 30 between what can be referred to as a closed or sealing position (FIGS. 4-5) preventing fluid flow through the port 12 and a fully open position which permits fluid flow through the port 12. The core 32 includes a first or sealing end 54 and a second or actuating end 56. The end 54 is a closed end with an angled sealing surface 58 that seals, for example via a metal-to-metal seal, with the valve seat 46 when the valve body 30 is at the closed position to prevent fluid flow through the port 12.

In one embodiment, the valve body 30, including the valve seat 46, and the core 32 can each be made of metal such as brass whereby a metal-to-metal seal is formed between the valve seat 46 and the sealing surface 58 at the closed position of the core 32 shown in FIGS. 4-5. In another embodiment, some or all of the valve seat 46 that is intended to be in contact with the sealing surface 58 at the closed position, and the sealing surface 58 of the core 32 that is intended to be in contact with the valve seat 46 at the closed position, can be made of metal such as brass, while the other portions of the valve body 30 and the core 32 are made of different materials, whereby a metal-to-metal seal is formed between the valve seat 46 and the sealing surface 58 at the closed position of the core 32 shown in FIGS. 4-5.

The external threads 50 on the core 32 are circumferentially continuous and are engageable with the threads 48 on the valve body 30. Upon rotation of the core 32 in the desired direction (i.e. clockwise or counterclockwise when viewing the end of the core 32), the engagement between the threads 48, 50 causes advancing or retraction movement of the core 32 relative to the valve body 30 in a direction parallel to the longitudinal axis A-A. The threads 50 extend along only a portion of the length of the core 32 between the ends of the core 32.

The core 32 is generally hollow from the end 56 toward the end 54 stopping short of the end 54. A plurality of fluid passageways 60 are formed through the core 32 between the end of the threads 50 and the end 54 that communicate with the hollow interior of the core 32. In the example illustrated in FIGS. 4-5, there are at least two of the passageways 60 that are evenly circumferentially spaced around the core 32. In one embodiment, the flow path through and around the core 32 is configured to minimize pressure drop and maintain the flow of the fluid. For example, the area of the passageways 60 can be selected to be substantially equal to the hollow interior area of the core 32 as well as substantially equal to the area of the flow path 40 through the valve seat 46. In operation, when the core 32 is at the open position, fluid can flow into the end 56 of the core 32, then out through the passageways 60, and then through the passageway 40 through the seat 46 to flow through the port 12. Alternatively, for fluid flowing in the opposite direction, fluid can flow through the seat 46, then inward through the passageways 60 in the core 32 and then out through the end 56.

The end 56 of the core 32 is configured to be engaged by a suitable service tool, such as the tool 20, for rotating the core 32 to insert the core 32 into the valve body 30 and/or advance and/or retract the core 32 relative to the valve body 30. For example, as best seen in FIGS. 4-5, the end 56 of the core 32 can include a circumferential detent groove 62 on an outer surface thereof that is engageable by the service tool 20 as described further below to hold the core 32 during processing. In addition, the core 32 can include a plurality, for example two or more, of circumferentially spaced protrusions 64a, 64b on the outer surface thereof between the detent groove 62 and the threads 50. As described in further detail below, the protrusions 64a, 64b are engageable by a mechanism on a service tool, such as a mechanism (for example teeth 156 described below) on the service tool 20, to rotate the core 32 relative to the valve body 30.

The valve body 30 is a single piece construction, and the core 32 is also a single piece construction. Sealing is achieved by the material-to-material seal between the valve body 30 and the core 32. There is no elastomeric sealing element on either the valve body 30 or on the core 32 that seals between the valve body 30 and the core 32. In addition, there is no biasing spring or other biasing member acting on the core 32. However, in other embodiments, an elastomeric sealing element may be provided on either the valve body 30 or on the core 32 that seals between the valve body 30 and the core 32 when the core 32 is at the closed position and/or a biasing spring or other biasing member may be provided that acts on the core 32. If a biasing member is provided, the biasing member acts to bias the core 32 toward a fully open position rather than biasing the core 32 toward the closed position as in a traditional valve.

In operation of the fluid access port 12, at the closed position of the core 32, the sealing surface 58 is sealed with the valve seat 46 preventing flow through the fluid access port 12 and the threads 48 are engaged with the threads 50. As the core 32 is actuated away from the valve seat 46 which unseats the end 54 from the seat 46, fluid can begin flowing through the fluid access port 12.

In another embodiment, the fluid access port 12 can have a construction like described in U.S. 2020/0041182 the entire contents of which are incorporated herein by reference.

Figure 6:
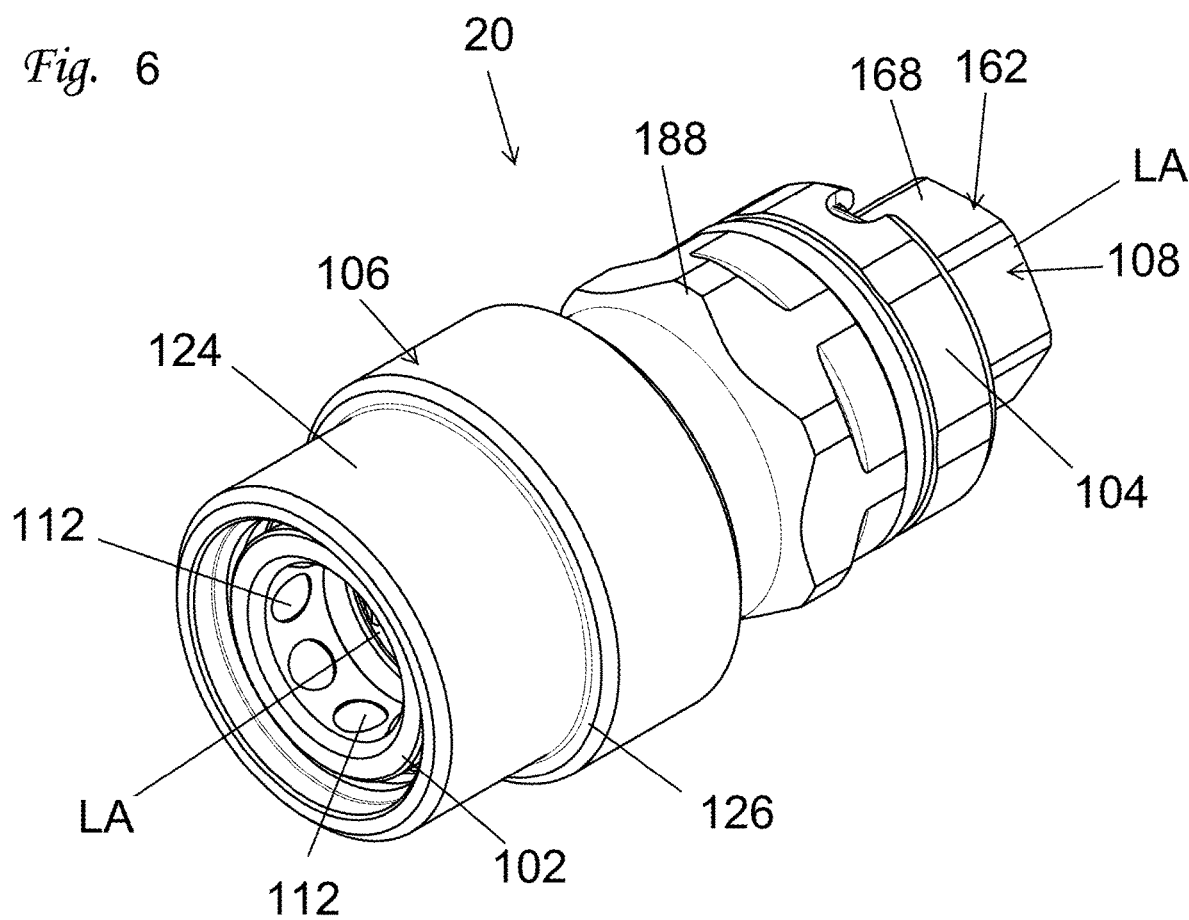
FIG. 6 is a perspective view of a traveling service tool that can be used with the fluid access port described herein.
Figure 7:
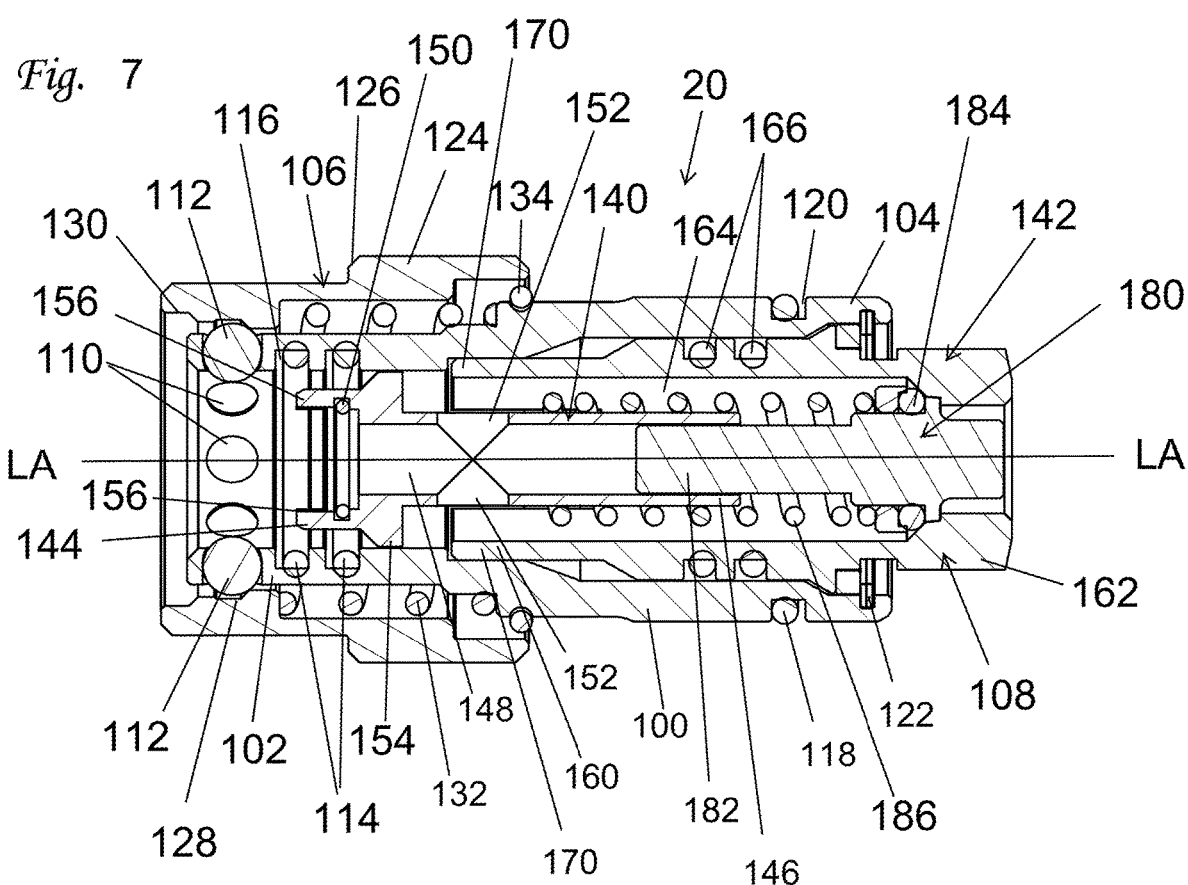
FIG. 7 is a longitudinal cross-sectional view of the traveling service tool of FIG. 6.
Figure 8:
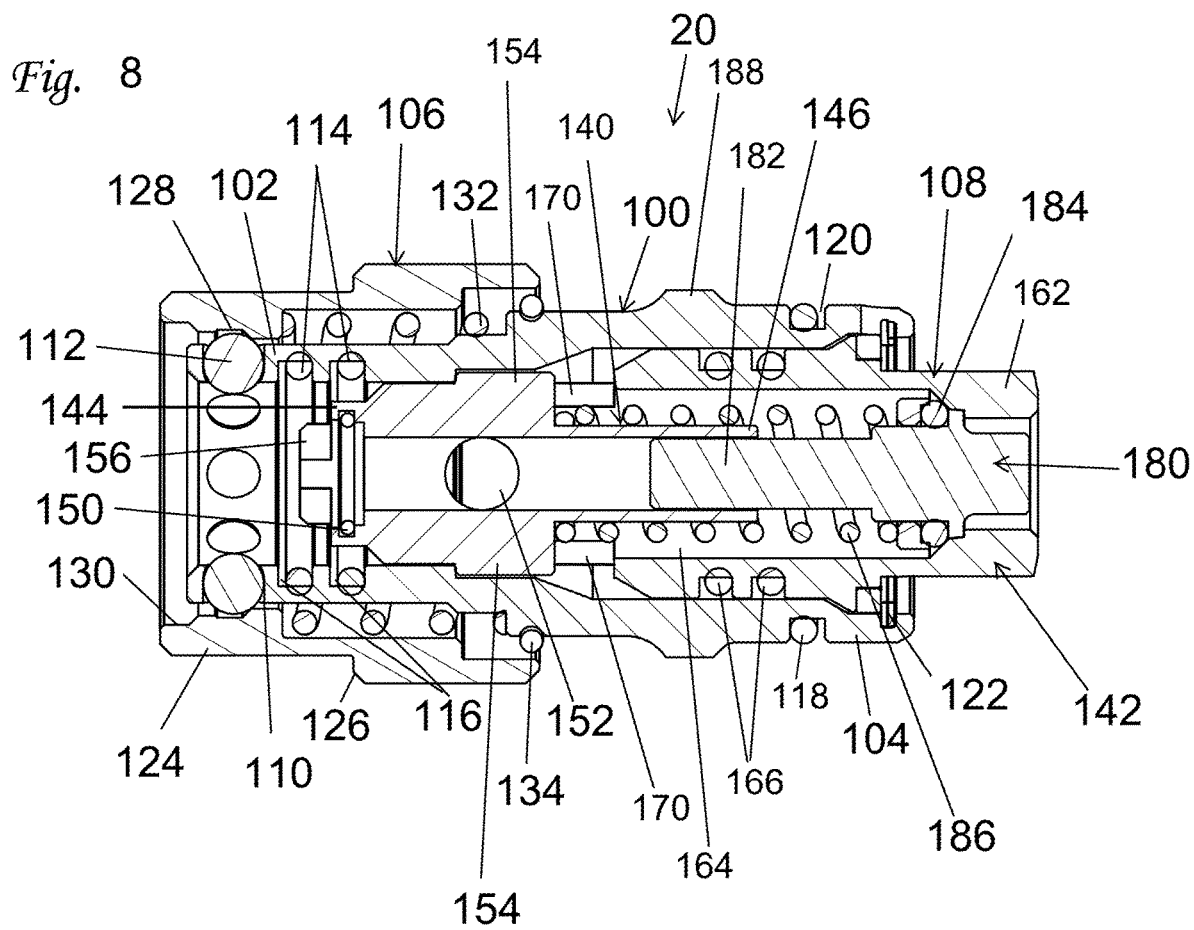
FIG. 8 is another longitudinal cross-sectional view of the traveling service tool but rotated 90 degrees compared to FIG. 7.

FIGS. 6-8 illustrate an example of the traveling service tool 20. In operation, the service tool 20 is configured to removably attach to the valve body 30 of the fluid access port 12. At the same time, the service tool 20 is configured to hold the core 32 during processing and then later the service tool 20 is configured to insert the core 32 into the valve body 30 and thread the core 32 so that the sealing surface thereof seals with the valve seat of the valve body 30 to seal the fluid access port 12. The service tool 20 is also provided with its own actuatable valve that can prevent flow through the service tool 20 when the valve is closed and permit flow through the service tool 20 when the valve is open. Referring to FIG. 2, the service tool 20 can be attached to the fluid access port at the processing station 16*b* or prior to the processing station, and remain attached to the fluid access port as the refrigerant system travels from the station 16*b* to the stations 16*c*-16*e*, with the service tool ultimately being removed from the fluid access port at the station 16*e* or even at the station 16*f*.

With continued reference to FIGS. 6-8, the service tool 20 is a generally cylindrical construction having a generally hollow cylindrical body 100 having a first end 102, a second end 104 and a longitudinal axis LA. A latching connecter 106 is provided at the first end 102 of the cylindrical body 100, and the latching connector 106 is configured to releasably connect the cylindrical body 100 to the fluid access port 12, for example by engaging with the detent groove 44. In addition, a torque assembly 108 is disposed at least partially within the cylindrical body 100, and the torque assembly 108 is rotatable relative to the cylindrical body 100 about the longitudinal axis LA.

Referring to FIGS. 7-8, the body 100 includes a plurality of through holes 110 circumferentially spaced from one another at the first end 102 and each receiving a ball 112 which forms part of the latching connector 106. In addition, an interior surface of the body 100 adjacent to the first end 102 includes one or more circumferential seals 114 that in use of the service tool 20 seal with the exterior surface 42 of the valve body 30. FIGS. 7-8 illustrate two of the seals 114, for example o-ring seals, disposed within circumferential channels 116 formed in the interior surface of the body 100. The body 100 further includes a seal 118 adjacent to the second end 104, for example an o-ring disposed in a circumferential channel 120 formed in an exterior surface of the body 100. In addition, the body 100 includes a retaining ring 122, such as a snap ring, on the interior surface at the second end 104, which retains the torque assembly 108 within the body 100.

With reference to FIGS. 6-8, the latching connector 106 includes the balls 112, and a cylindrical sleeve 124 at the first end 102 of the body 100 and surrounding the first end 102. The sleeve 124 is mounted on the body 100 so as to be movable in forward and rearward directions relative to the body 100 in the direction of the longitudinal axis LA between a latched position (shown in FIGS. 7 and 8) and a retracted, release position (not shown). An outer surface of the sleeve 124 includes a shoulder 126 or other gripping mechanism to facilitate pulling back on the sleeve 124 to the retracted, release position. An interior surface of the sleeve 124 includes a circumferential locking channel 128 that, in the forward, latched position of the sleeve 124, is disposed radially over the balls 112 and prevents radial outward movement of the balls 112. The interior surface further includes an increased diameter step region 130 located forward of the channel 128. In the retracted, release position of the sleeve 124, the region 130 is located radially over the balls 112 which allows the balls 112 to move radially outward to release engagement with the valve body 30. A biasing element 132, for example a coil spring, is engaged with the sleeve 124 and the body 100 and biases the sleeve 124 in a forward direction toward the latched position. A retaining element 134, such as a retaining ring, is disposed on the body 100 and limits the rearward movement of the sleeve 124.

With reference to FIGS. 7-8, the torque assembly 108 is at least partially disposed within the body 100. For example, the majority of the torque assembly 108, or substantially all of the torque assembly, is disposed within the body 100. The torque assembly 108 is configured to be rotatable relative to the body 100 in both clockwise and counterclockwise directions about the longitudinal axis LA when viewing the service tool 20 from an end. The torque assembly 108 is also configured to hold the core 32 (seen in FIG. 9) during processing, insert the core into the valve body 30 (FIG. 9), and thread the core 32 into the valve body 30 resulting from engagement of the threads 48, 50 and rotation of the torque assembly 108 at an appropriate time in the processing. The torque assembly 108 can have any configuration and construction that is suitable to achieve these tasks.

Figure 9:
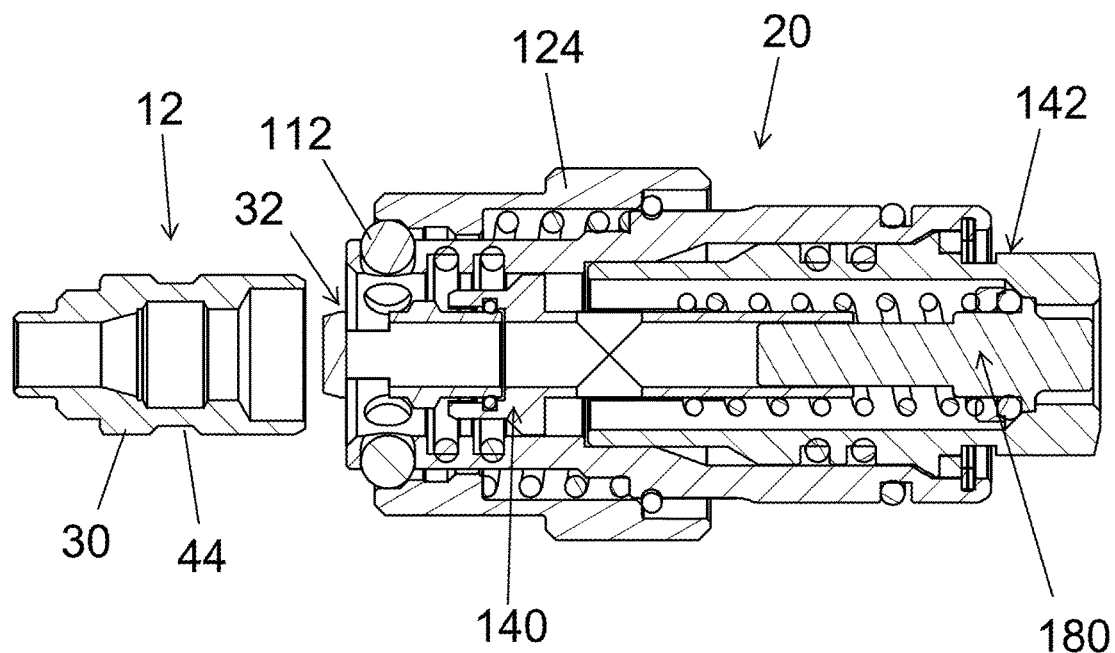
FIG. 9 is a longitudinal cross-sectional view of the traveling service tool in position relative to the fluid access port and with the core installed in the traveling service tool.

In FIGS. 7 and 8, the torque assembly 108 is depicted as including two primary components, a torque shaft 140 and a torque cartridge 142. The torque shaft 140 is a hollow, cylindrical structure having a first end 144, a second end 146 and a passageway 148 extending from the first end 144 to the second end 146. The first end 144 is sized to receive the end 56 of the core 32 therein (see FIG. 9), and an interior surface of the torque shaft 140 at the first end 144 includes a circumferential retainment ring 150 that fits into the detent groove 62 of the core 32. The end of the core 32 fitting within the end 144 together with the retainment ring 150 fitting into the detent groove 62 of the core 32 form a seat to allow the torque shaft 140, and therefore the torque assembly 108, to temporarily and releasably hold the core 32 as depicted in FIG. 9. The torque shaft 140 further includes at least one opening 152 therein that communicates the passageway 148 with an exterior of the torque shaft 140. FIGS. 7 and 8 illustrate two of the openings 152 diametrically opposite one another although a smaller or larger number of openings 152 can be provided. The torque shaft 140 further includes circumferentially spaced radial flanges 154 that are slidably engaged with an interior surface of the body 100 to stabilize the torque shaft 140, permit rotation of the torque shaft 140 relative to the body 100, and permit axial movement of the torque shaft 140 relative to the body 100 in the direction of the longitudinal axis LA. Further, the first end 144 of the torque shaft 140 has a toothed structure with circumferentially spaced, axially projecting teeth 156. The teeth 156 extend between the protrusions 64a, 64b on the core 32 to cause rotation of the core 32 when the torque shaft 140 is rotated.

With continued reference to FIGS. 7 and 8, the torque cartridge 142 is a hollow, cylindrical structure having a first end 160, a second end 162 and a passageway 164 extending from the first end 160 to the second end 162. The exterior surface of the first end 160 is slidably supported by an interior surface of the body 100 to permit rotation of the torque cartridge 142 relative to the body 100. The torque cartridge 142 further includes one or more circumferential seals 166 on an exterior surface thereof that seal with an interior surface of the body 100. The second end 162 projects beyond the second end 104 of the body 100. As best seen in FIG. 6, the second end 162 is configured as a hex head with flats 168 to permit engagement by a tool for rotating the torque cartridge 142. In addition, the first end 160 has a pair of axially projecting fingers 170 that extend between the radial flanges 154 on the torque shaft 140 such that rotation of the torque cartridge 142 drives rotation of the torque shaft 140.

The torque assembly 108 further includes a valve 180 that controls the flow of fluid through the service tool 20 and that is configured to rotate with the torque assembly 108. The valve 180 can have any construction that achieves these functions. In FIGS. 7 and 8, the valve 180 is illustrated as a poppet valve having a poppet shaft 182 that extends into the open end of, and is axially movable relative to, the torque shaft 140. A seal 184 is provided on the poppet that can seal with a seat on an interior surface of the torque cartridge 142. In addition, a biasing element 186, for example a coil spring, is engaged between the torque shaft 140 and the seal 184 and biases the seal 184 into engagement with the seat on the torque cartridge 142 as depicted in FIGS. 7 and 8.

Figure 10:
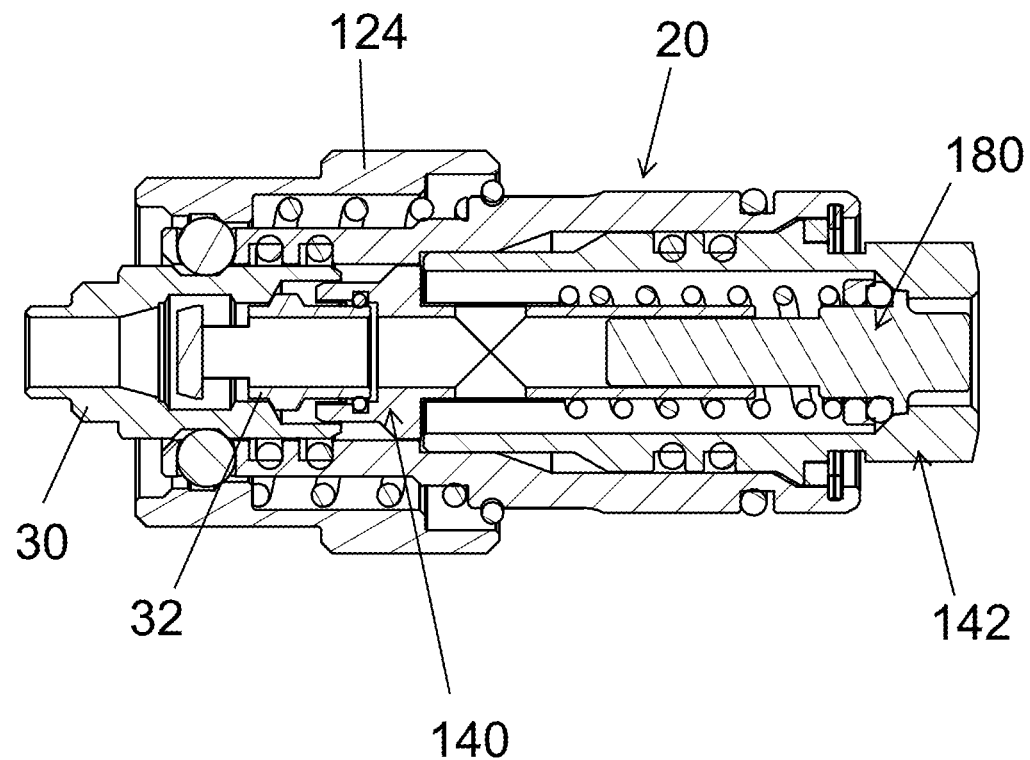
FIG. 10 shows the traveling service tool removably attached to the fluid access port with the core held between the seat on the valve body and the traveling service tool.
Figure 11:
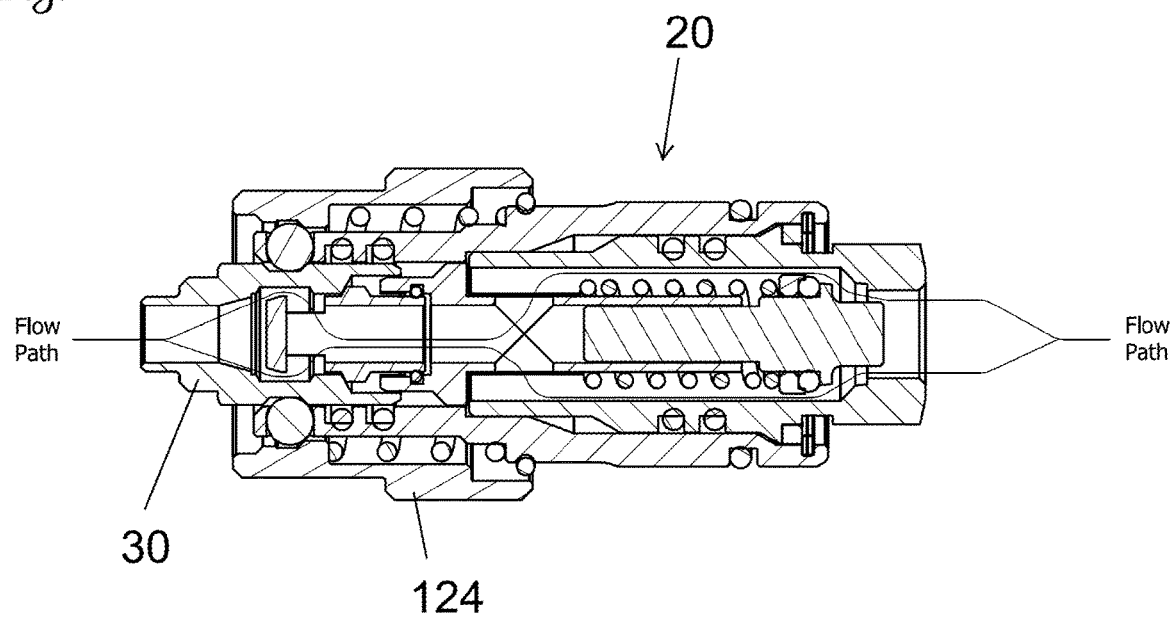
FIG. 11 is a view similar to FIG. 10 but showing the flow path of fluid through the traveling service tool and the fluid access port.

Operation of the service tool 20 will now be described with respect to FIGS. 9-11. Initially, with the service tool 20 in the position shown in FIGS. 7-8, the core 32 is temporarily mounted in the seat at the end of the torque shaft 140. For example, the core 32 can be manually mounted in the seat. The core 32 can be mounted in the seat at the station 16b (FIG. 2) or prior to the station 16b. When the core 32 is fully mounted, the end 54 of the core 32 projects past the end of the service tool 20 as seen in FIG. 9.

Once the core 32 is mounted in the service tool 20, the service tool 20 is brought toward the valve body 30 which has been attached to the refrigeration system. The sleeve 124 of the latching connector is pulled back allowing the balls 112 to move radially outward, and the service tool 20 is pushed onto the end of the valve body 30. At the same time, the valve body 30 pushes the torque shaft 140 rearward (see FIG. 10) locking the core 32 between the valve body 30 and the service tool 20. The service tool 20 is fully installed when the balls 112 reach the detent groove 44 allowing the balls 112 to drop inward and the sleeve 124 is biased forward to the latched position locking the service tool 20 to the valve body 30. The valve 180 of the service tool 20 remains closed sealing the refrigeration system. Thereafter, with reference to FIG. 11, when the valve 180 is opened, for example by pushing the poppet valve to the left, fluid can flow through the service tool 20, into or from the refrigeration system, via the flow path depicted. In addition, upon completion of processing, for example at the station 16f, the torque shaft 140 of the torque assembly is rotated to thread the core 32 into the valve body 30 to seal the system.

FIGS. 12-13 illustrate another example of a service tool 200. The service tool 200 detachably connects to the service tool 20 to process fluid into or from the refrigeration system through the service tool 20 and the service tool 200. For example, the service tool 200 can connect to the service tool 20 at the station 16b (FIG. 2) for use in evacuating the refrigeration system. Once evacuation is complete, the service tool 200 can be detached from the service tool 20 before the refrigerant system together with the service tool 20 are transported to the next station 16c (FIG. 2).

With continued reference to FIGS. 12-13, the service tool 200 is a generally cylindrical construction having a generally hollow cylindrical body 202 having a first end 204, a second end 206 and a longitudinal axis that is coaxial to the longitudinal axis of the service tool 20. A latching connecter 208 is provided at the first end 204 of the cylindrical body 202, and the latching connector 208 is configured to releasably connect the cylindrical body 202 to the service tool 20, for example by engaging behind a circumferential, radial flange 188 on the exterior surface of the body 100 of the service tool 20 (see FIGS. 6, 8 and 13).

Referring to FIG. 12, the latching connector 208 includes a plurality of through holes 210 circumferentially spaced from one another at the first end 204 of the body 202 and each receiving a ball 212. The latching connector 208 further includes a cylindrical sleeve 214 at the first end 204 of the body 202 and surrounding the first end 204. The sleeve 214 is mounted on the body 202 so as to be movable in forward and rearward directions relative to the body 202 in the direction of the longitudinal axis between a latched position (shown in FIG. 13) and a retracted, release position (shown in FIG. 12). An outer surface of the sleeve 214 includes a shoulder 216 or other gripping mechanism to facilitate pulling back on the sleeve 214 to the retracted, release position. An interior surface of the sleeve 214 includes a first diameter portion 218 that, in the forward, latched position of the sleeve 214, is disposed radially over the balls 212 and prevents radial outward movement of the balls 212. The interior surface further includes an increased diameter step region 220 located forward of the portion 218. In the retracted, release position of the sleeve 214, the region 220 is located radially over the balls 212 which allows the balls 212 to move radially outward during connection and disconnection. A biasing element 222, for example a coil spring, is engaged with the sleeve 214 and the body 202 and biases the sleeve 214 in a forward direction toward the latched position.

With continued reference to FIG. 12 along with FIG. 13, a valve 224 is provided in the body 202 that controls the flow of fluid through the service tool 200 and that is configured to engage with the valve 180 on the service tool 20 to open the valve 180 when the service tool 200 is connected to the service tool 20. The valve 224 can have any construction that achieves these functions. In FIGS. 12 and 13, the valve 224 is illustrated as a poppet valve having a poppet body 226 with an axial projection or axial pin 228 at one end. A seal 230 is provided on the poppet body 226 that can seal with a seat on an interior surface of the body 202. In addition, a biasing element 232, for example a coil spring, is engaged between the body 202 and the poppet body 226 and biases the seal 230 into engagement with the seat on the body as depicted in FIG. 12.

FIG. 13 shows the service tool 200 attached to the service tool 20. The service tool 200 is brought toward the service tool 20. The sleeve 214 of the latching connector is pulled back allowing the balls 212 to move radially outward, and the service tool 200 is pushed onto the end of the service tool 20. As this occurs, the axial projection 228 engages the end of the poppet shaft 182 of the valve of the service tool 20 which pushes the poppet shaft 182 to the left in FIG. 13 thereby unseating the seal 184. In addition, the poppet body 226 is forced to the right in FIG. 13 which unseats the seal 230. The service tool 200 is fully installed when the balls 212 reach the left side of the flange 188 of the service tool 20 (FIGS. 6 and 8) allowing the balls 212 to drop inward and the sleeve 214 is biased forward to the latched position locking the service tool 200 to the service tool 20. Fluid can therefore flow through the service tools 20 and 200 into or from the refrigeration system, via the flow path depicted in FIG. 13. Once processing is complete, the service tool 200 can be disconnected from the service tool 20 by retracting the sleeve 214, allowing the service tool 200 to be pulled away from the service tool 20, with the respective biasing elements automatically biasing the poppets on the service tools 20, 200 to the closed positions.

When the service tool 200 is attached to the service tool 20, the service tool 200 is configured to the prevent disconnection or release of the service tool 20 from the fluid access port. For example, as best seen in FIGS. 12-13, the first end 204 of the body 202 is adjacent to or abuts against the end of the sleeve 124 (see FIG. 7) of the service tool 20. This prevents sufficient movement of the sleeve 124 to permit disconnection of the service tool 20 from the fluid access port.

FIGS. 14-16 illustrate another example of a service tool 300. The service tool 300 detachably connects to the service tool 20 to process fluid into or from the refrigeration system through the service tool 20 and the service tool 300. For example, the service tool 300 can connect to the service tool 20 at the station 16d (FIG. 2) for use in testing the refrigeration system and at the station 16e (FIG. 2) for final fill, close and reclaim. The service tool 300 can be detached from the service tool 20 before the refrigerant system together with the service tool 20 are transported to the next station 16e (FIG. 2) where a different one of the service tools 300 can be attached to the service tool 20, or the service tool 300 can remain attached to the service tool 20 as the refrigerant system travels from the station 16d to the station 16e.

With continued reference to FIGS. 14-16, the service tool 300 is a generally cylindrical construction having a generally hollow cylindrical body 302 having a first end 304, a second end 306 and a longitudinal axis that is coaxial to the longitudinal axis of the service tool 20. A latching connecter 308 is provided at the first end 304 of the cylindrical body 302, and the latching connector 308 is configured to releasably connect the cylindrical body 302 to the service tool 20, for example by engaging behind the circumferential, radial flange 188 on the exterior surface of the body 100 of the service tool 20 (see FIGS. 6, 8 and 16). In an embodiment, when the service tool 300 is attached to the service tool 20, the service tool 20 is prevented from being released because the sleeve 124 (see FIGS. 6-11) of the service tool 20 cannot be retracted.

Referring to FIGS. 15 and 16, the latching connector 308 includes a plurality of through holes 310 circumferentially spaced from one another at the first end 304 of the body 302 and each receiving a ball 312. The latching connector 308 further includes a cylindrical sleeve 314 at the first end 304 of the body 302 and surrounding the first end 304. The sleeve 314 and the body 302 are movable relative to one another in forward and rearward directions in the direction of the longitudinal axis between a latched position (shown in FIG. 16) and a retracted, release position (FIG. 15).

A handle 316 is pivotally attached to the body 302 by pivots 318 for pivoting movement from the disconnected position shown in FIG. 14 where the handle 316 is generally parallel to the longitudinal axis to a connected position (not visible in FIG. 16) where the handle 316 is generally 90 degrees to the longitudinal axis. To connect to the service tool 20, the sleeve 314 is retracted which allows the balls 312 to move radially outward over the service tool 20. Once the balls 312 are beyond the radial flange 188 of the service tool, the sleeve 314 is released and can move forward latching the service tool 300 to the service tool 20. The handle 316 can then be pivoted to the connected position which drives forward a push piston 322 and a sealing piston 324. For example, the handle 316 can include cam surfaces 320 at one end thereof. The cam surfaces 320 are in engagement with the push piston 322 which in turn is engaged with the sealing piston 324.

The push piston 322 and the sealing piston 324 are both slideably disposed in the body 302 and can slide axially relative to body 302. The push piston 322 is configured to push on the sealing piston 324 when the handle 316 is actuated from the disconnected position to the connected position, with the push piston 322 actuated by the cam surfaces 320. Although the push piston 322 and the sealing piston 324 are illustrated as being separate elements, the push piston 322 and the sealing piston 324 can be integrated together as a unitary, one-piece construction.

With continued reference to FIGS. 15-16, the sealing piston 324 includes an internal passageway 326 with a valve 328, such as a poppet valve, controlling flow through the passageway 326. The valve 328 includes a seal 330 that is sealed with a valve seat 332 formed on the internal surface of the sealing piston 324. The seal 330 is biased by a biasing member 334, for example a coil spring, into engagement with the valve seat 332. The other end of the biasing member 334 is engaged with a fluid conduit 336 that can connect to a fluid system. As best seen in FIG. 14, an end of the conduit 336 can be provided with a hex head 338.

In addition, a biasing element 340, for example a coil spring, is engaged between the body 302 and the sealing piston 324 that biases the body 302 and the piston 324 away from one another. The end of the sealing piston 324 further includes a sealing sleeve 342 projecting therefrom. In the connected position of the service tool 300, the sealing sleeve 342 surrounds the end of the service tool 20 and seals with the seal 118 on the service tool 20 as best seen in FIG. 16. Returning to FIGS. 15-16, the valve 328 further includes a projecting pin 344 that in use engages with the valve 180 on the service tool 20 to open the valve 180.

FIG. 16 shows the service tool 300 attached to the service tool 20. With the handle 316 in the disconnected position shown in FIG. 14 and the sleeve 314 retracted, the balls 312 can move radially outward as the end of service tool 300 is slid over the end of the service tool 20. Once the balls 312 are beyond the radial flange 188, the sleeve 314 moves forward latching the balls 312 behind the flange 188 on the service tool 20 (FIGS. 6 and 8) thereby locking the service tool 300 to the service tool 20. The handle 316 is then pivoted to the connected position, driving forward the push piston 322 and the sealing piston 324. As this occurs, the sealing sleeve 342 surrounds the end of the service tool 20 and the pin 344 engages the end of the poppet shaft of the valve 180 of the service tool 20 which pushes the valve 180 open. At the same time, the sealing piston 324 unseats the valve 328 from the valve seat 332. Fluid can therefore flow through the service tools 20 and 300 into or from the refrigeration system, via the flow path depicted in FIG. 16. Once processing is complete, the service tool 300 can be disconnected from the service tool 20 by rotating the handle 316 90 degrees back to the disconnected position shown in FIG. 14, and the sleeve 314 can be pulled back allowing the service tool 300 to be pulled away from the service tool 20, with the respective biasing elements automatically biasing the poppets on the service tools 20, 300 to the closed positions.

When the service tool 300 is attached to the service tool 20, the service tool 300 is configured to the prevent disconnection or release of the service tool 20 from the fluid access port. For example, as best seen in FIG. 16, the first end 304 of the body 302 is adjacent to or abuts against the end of the sleeve 124 (see FIG. 7) of the service tool 20. This prevents sufficient movement of the sleeve 124 to permit disconnection of the service tool 20 from the fluid access port.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A service tool for connecting to a fluid access port that is operable with a removable core which is configured to control fluid flow through the fluid access port when the removable core is mounted within the fluid access port, the service tool comprising:
   a generally hollow cylindrical body having a first end, a second end and a longitudinal axis;
   a latching connecter at the first end of the generally hollow cylindrical body, the latching connector is configured to releasably connect the generally hollow cylindrical body to the fluid access port;
   a torque assembly disposed within the generally hollow cylindrical body, the torque assembly is rotatable relative to the generally hollow cylindrical body about the longitudinal axis;
   the torque assembly includes a fluid flow passageway through which fluid can flow, a poppet valve in the fluid flow passageway that controls fluid flow through the fluid flow passageway, the poppet valve is rotatable with the torque assembly relative to the generally hollow cylindrical body, and a seat defined on the torque assembly that is configured to hold the removable core thereon so that the removable core is rotatable with the torque assembly.

2. The service tool of claim 1, wherein the torque assembly comprises a torque cartridge and a torque shaft, the fluid passageway extends through the torque cartridge and the torque shaft; the poppet valve is mounted in the fluid passageway of the torque cartridge; and the seat is defined on the torque shaft.

3. The service tool of claim 2, wherein the torque cartridge and the torque shaft are rotatable together relative to the generally hollow cylindrical body, and the torque shaft is mounted so as to be movable relative to the torque cartridge in a direction parallel to the longitudinal axis.

4. The service tool of claim 1, wherein the seat is disposed completely within the generally hollow cylindrical body and when the removable core is held on the torque assembly the removable core is at least partially disposed within the generally hollow cylindrical body.

5. The service tool of claim 1, wherein the torque assembly projects beyond the second end of the generally hollow cylindrical body, and the poppet valve projects beyond the second end of the generally hollow cylindrical body.

6. The service tool of claim 1, wherein the seat comprises a retainment ring, and the generally hollow cylindrical body comprises an interior surface with a seal disposed thereon that is radially aligned with the retainment ring.

7. The service tool of claim 1, wherein the generally hollow cylindrical body includes an exterior surface, and a circumferential detent groove is formed in the exterior surface between the first end and the second end and between an end of the latching connector and the second end.

8. The service tool of claim 7, further comprising a seal disposed on the exterior surface between the circumferential detent groove and the second end.

9. A system comprising the service tool of claim 1, and a first additional service tool that is configured to removably attach to the service tool.

10. The system of claim 9, further comprising a second additional service tool that is configured to removably attach to the service tool.

11. The system of claim 10, wherein the first additional service tool and/or the second additional service tool is configured to prevent disconnection of the service tool from the fluid access port when the first additional service tool and/or the second additional service tool is attached to the service tool.

12. The system of claim 11, wherein each of the first additional service tool and the second additional service tool are configured to prevent disconnection of the service tool from the fluid access port when the first additional service tool and the second additional service tool are attached to the service tool.

* * * * *